Jan. 3, 1956

A. L. WALLACE 2,728,942

VULCANIZING MOLD

Filed Oct. 20, 1950

2 Sheets-Sheet 1

INVENTOR.
Archibald L. Wallace
BY
Lyman E. Dodge
ATTORNEY

Jan. 3, 1956     A. L. WALLACE     2,728,942
VULCANIZING MOLD
Filed Oct. 20, 1950     2 Sheets-Sheet 2
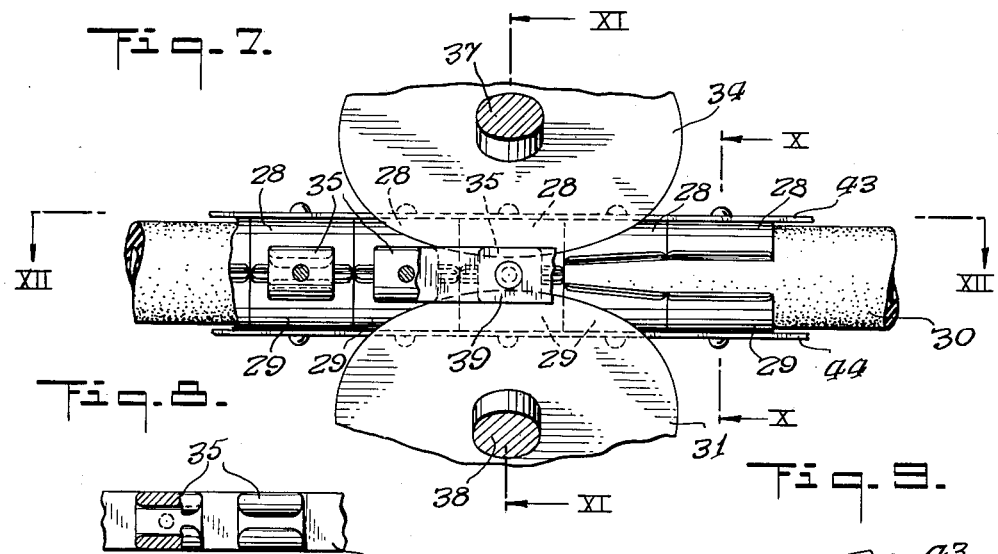
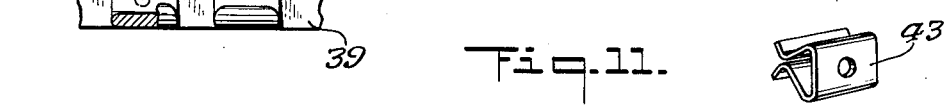
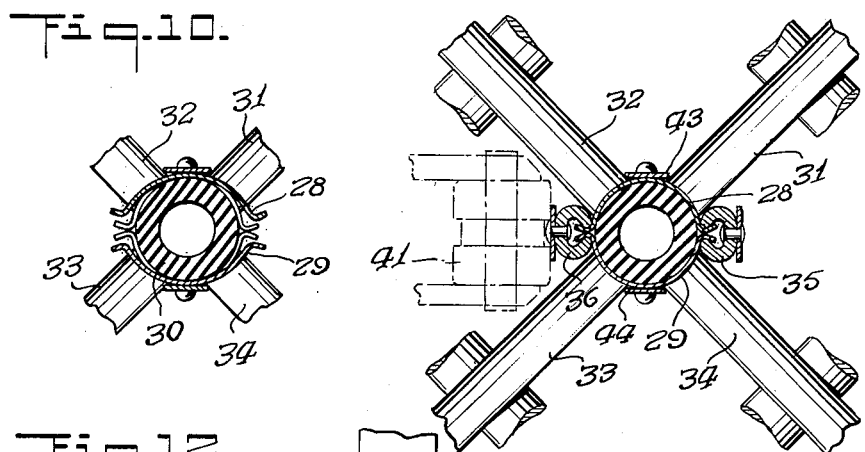
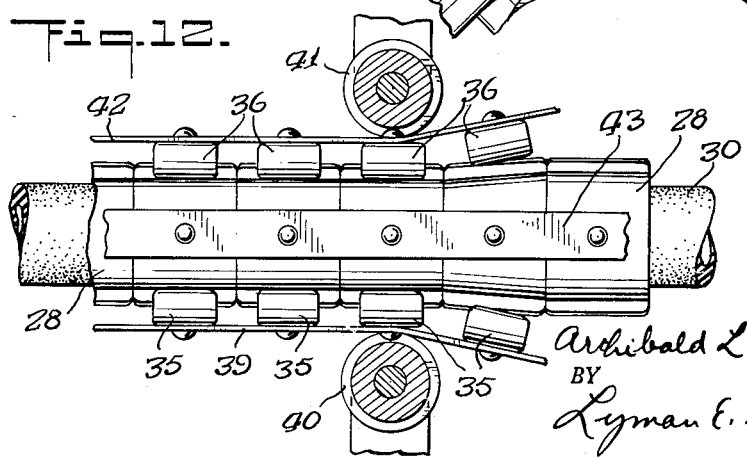
INVENTOR.
Archibald L. Wallace
BY Lyman E. Dodge
ATTORNEY

United States Patent Office 2,728,942
Patented Jan. 3, 1956

---

2,728,942

VULCANIZING MOLD

Archibald L. Wallace, Mountain Lakes, N. J.

Application October 20, 1950, Serial No. 191,246

3 Claims. (Cl. 18—6)

This invention relates to vulcanizing and particularly to molds therefor and more especially to continuous constricting molds and methods for closing them.

A principal object of this invention is to provide a means and method for constricting objects while being vulcanized which will function to continuously constrict the object as it becomes vulcanized.

A further object of the invention is to provide a construction whereby molds which are initially not the shape of the object to be molded may be forced into a proper shape surrounding the object to be vulcanized.

A further object of the invention is to provide such molds and method as above specified which will be applicable in a continuous vulcanizing method.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which—

Figure 1:
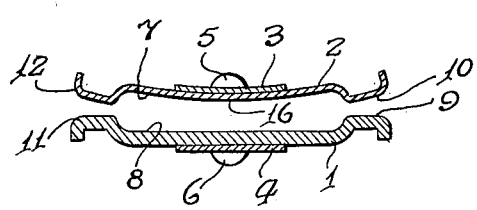
Figure 2:
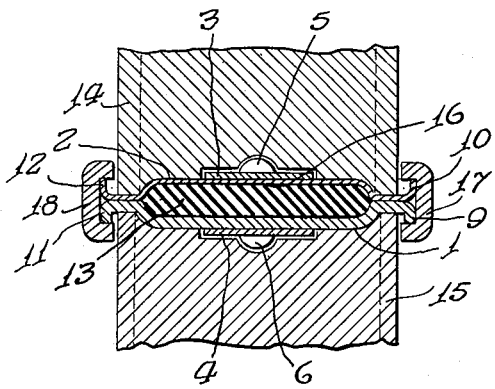
Figure 3:
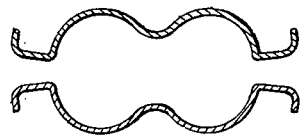
Figure 4:
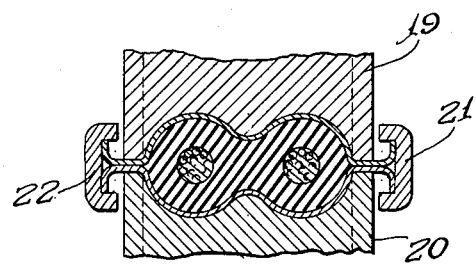
Figure 5:
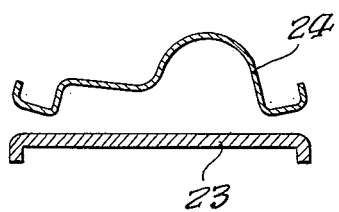
Figure 6:
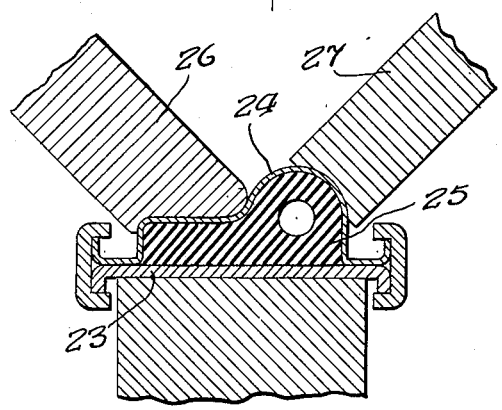

Fig. 1 is a cross sectional view of a pair of mating molds constructed in accordance with my invention; Fig. 2 is a cross sectional view illustrating the manner of using the molds of Fig. 1; Fig. 3 is a cross sectional view of a modified form of mating molds made in accordance with my invention; Fig. 4 is a cross section illustrating the use of the molds of Fig. 3; Fig. 5 is another modified form of mating molds of my invention; Fig. 6 is a cross sectional view illustrating the mode of using the molds of Fig. 5; Fig. 7 is a fragmentary side plan view of a series of mating molds illustrating the manner of securing the mating molds together by means of clamps or dogs; Fig. 8 is a plan view of one form of clamp or dog showing its assembly on a belt; Fig. 9 is a perspective view of a modified form of clamp; Fig. 10 is a cross sectional view illustrating a further modified form of mating molds and the means for pressing the molds together; Fig. 11 is a cross sectional view illustrating the completed fastening of the molds as shown in Fig. 10; Fig. 12 illustrates a series of molds, the belt upon which they are fastened and the means for forcing them into place.

While vulcanizing an object made of either natural or artificial rubber, it is essential to keep the object continuously compressed. If the object is hollow, air pressure may be applied to the interior thereof to attain the necessary continuous compression against the outside mold even if the object decreases in volume during vulcanization. Many objects when completed may be hollow but in curing them a solid core may be employed. Many other objects are solid. In both of these cases if the mold is rigid and its parts relatively fixed, then as the vulcanization proceeds and the volume of the object decreases, the object is not continuously compressed and the object is likely to be porous and spongy.

The difficulty, above mentioned, is especially present in continuous processes, that is, processes by which objects of indefinite and great length are made such as hose, belting, insulated electrical conductors, and weather strips.

My mold and my method of closing my mold about an object to be vulcanized are particularly applicable to a continuous process of vulcanization.

My molds are of a type to be mounted individually in a continuous series on a belt, generally of metal, such as steel. The use of my molds results in a continuous series or belts of molds opposing a similar series or belt of molds just as is common in the art of continuous vulcanization as is well illustrated by belts 47 and molds 39 of my prior Patent 2,187,253, of January 16, 1940, and also my pending application for Patent Serial No. 698,590, filed September 21, 1946, now Patent No. 2,533,590. In assembled form, I also retain my mating molds together by a dog or clamp corresponding to clamp 46 of Patent 2,187,253.

My present invention is directed to the molds per se, the manner of forcing them into proper mating position and a specific form of clamp or dog to hold them in mating position.

In Fig. 1 I have shown two mating molds 1 and 2. These molds may be made of any suitable or appropriate material, but at least one of them must be made of a deformable elastic material such as sheet spring steel. In Fig. 1 I have shown one of the molds, 1, as made of rigid material and non-deformable. The mating mold 2 is made of the deformable elastic springy material.

My molds are particularly adapted, as hereinbefore stated, to the continuous process of vulcanizing, such as the continuous process of making a belt of indefinite and great length. To this end, I arrange each of my molds upon a belt as belt 3 and belt 4. Each of the molds may be attached to the belts by any suitable or convenient means, as by rivets, as 5 and 6. All of the molds illustrated and described are intended to be attached to a belt such as 5, although in some of the views I have not illustrated the belt to which the molds are attached.

The mold 2 is initially formed so that its inner surface 7 does not conform to the inner surface 8 of the rigid mold 1 and does not conform to the profile contour of the outside of the object which is to be vulcanized by means of the molds. If the ends as 9 and 10 and 11 and 12 are brought together the volume of the space defined by the inner surfaces of the mating molds is less than the volume of the contained object to be vulcanized therebetween.

When the object to be vulcanized as 13 of Fig. 2 is placed between the mating molds 1 and 2, and the ends of the molds forced together by means of rollers as 14 and 15, the intermediate portion 16 of mold 2 is deformed and in the beginning assumes a position somewhat higher than the surface 16 as shown in Fig. 2 so that the intermediate portion 16, after the ends of the molds are retained in position by clamps or dogs as 17 and 18, exerts an elastic follow-up pressure on the object to be vulcanized. The vulcanization takes place by reason of heat applied, in the usual manner, as shown in my prior patent and patent application hereinbefore mentioned, and the follow-up pressure on the object to be vulcanized. The vulcanization takes place by reason of heat applied, in the usual manner, as shown in my prior patent and patent application hereinbefore mentioned, and the follow-up pressure exerted by the mold 2 condenses the material of the object 13 being vulcanized so that voids and sponginess are avoided.

The length of the molds is that usual for a series of molds such as those shown in my prior patent and patent application.

In Fig. 3 I illustrate two mating molds, both of which are made of elastic deformable material, such as the material used for the molds of Fig. 1. The molds of Fig. 3 are initially formed so that when their ends are brought together, the volume defined therebetween is less than the volume of the completed article to be vulcanized therein.

These molds are brought together by rollers as 19 and 20 as shown in Fig. 4 and then clamps as 21 and 22 applied to their ends so that they are retained together upon removal from between the rollers. These molds, like the molds of Fig. 1, exert a continuous follow-up elastic pressure upon the body, in this case an insulated twin conductor, while vulcanization is going on.

Fig. 5 illustrates a rigid mold 23 and a deformable elastic mold 24. This mold 24 is especially formed to produce weather stripping 25 and, like the other molds, does not have an initial cross sectional inner surface profile corresponding to the outside contour profile of the finished article, but is forced into position by roller actions. In this case two revolving rollers 26 and 27 are used as thereby the proper positioning of the ends of the molds one against the other is more readily accomplished.

In Fig. 10 I show two mating molds 28 and 29. These mating molds are intended for use in the vulcanization of a cylindrical body, such as a hose 30. Initially the inside surface of the mating molds does not define a true circle as the ends of the molds depart quite widely from the true circular position, but the mating molds are brought together, in this case, by the use of four rollers as 31, 32, 33 and 34. The final position of the mating molds 28 and 29 is shown in Fig. 11 and there is also shown in Fig. 11 the clamps or dogs 35 and 36 which hold the mating molds together after passing out from beneath the rollers.

A series of molds 28 and 29 are shown in Fig. 7 each separate mold being designated by the same numeral.

Fig. 7 also illustrates the rollers 31 and 34 rotatable upon shafts 37 and 38 and also illustrates the dog as 35 attached to a belt 39. The dogs 35 and 36 and the belt 39 are well shown in Fig. 12 which also shows rollers 40 and 41 for forcing the dogs 35 and 36 into position to clamp the ends of the molds as 28 and 29.

It is to be understood that in use ordinary means are used for rotating the various rollers and for causing movement of the belts as 39 and 42 carrying the dogs and belts 43 and 44 carrying the mating mold segments.

The necessary follow-up pressure may be obtained by making my mating molds as hereinbefore described and then holding them together by means of a rigid clamp or dog such as 35 and 36. I may also use a less springy or almost rigid mold and hold the molds together by a dog such as is shown in Fig. 9 and designated 43. This dog may be made of an elastic material such as spring steel so that when the ends of the mating molds are held together thereby, it exerts a constant pressure to pull the ends together thereby exerting a continuous follow-up pressure on the object to be vulcanized because when the pressure of the rolls forcing the molds together is withdrawn, the ends of the molds may separate slightly but a pressure will be constantly exerted to bring the ends together and so exert a follow-up pressure on the object being vulcanized.

From the hereinbefore given description it will be seen that I have provided molds of the mating form which are of a construction such that they may be used in a series on a traveling belt to enclose an object such as a hose 30 which is to be vulcanized, and that the molds are made in pairs or mates so as to form a proper inside contour to correspond with the outside profile contour of an object to be vulcanized. The molds are further formed initially so that when an object to be vulcanized is compressed therebetween, the deformable mold, and its intermediate portion, is distorted or deformed, so that after its ends are fastened together by dogs, and it is withdrawn from the action of the pressure rollers, the molds exert a continuous follow-up elastic pressure against the object being vulcanized so as to prevent voids or sponginess therein.

Although I have particularly described particular physical embodiments of my invention and explained the construction and principle thereof, nevertheless, I desire to have it understood that the forms selected are merely illustrative, but do not exhaust the possible physical embodiments of the idea of means underlying my invention.

What I claim as new and desire to secure by Letters Patent is:

1. A vulcanizing apparatus, including, in combination, two mating molds for receiving an object to be vulcanized, at least one of said molds being deformable, the deformable mold being initially formed with an inner surface profile departing from the exterior profile desired in the finished vulcanized object, a roller brought to bear at times against the exterior surface of a deformable mold and formed with a profile such that it forces the deformable mold at at least one end in close contact with the end of the mating mold, said end being beyond the points of contact of the roller, said roller also so formed that it forces an intermediate portion of the deformable mold tightly against the object to be vulcanized positioned between the molds, and a clamp bearing solely at the end of the mating molds whereby the molds are kept together after being pressed together by the roller and after the roller is no longer pressing against the mold, said deformable mold being formed of elastic material and the intermediate portion of the mold between the ends being free to deform and naturally defining in conjunction with the mating mold a volume of the object to be vulcanized whereby the deformable mold maintains a follow-up pressure on the object to be vulcanized after the pressure of the roller is removed but the ends of the molds are held together by the clamps.

2. A vulcanizing apparatus including, in combination two mating molds for constricting an object to be vulcanized, at least one of said molds formed of a deformable elastic material and initially having an inner surface departing from the exterior profile of the object to be vulcanized and a roller brought to bear at times against the exterior of the deformable mold formed with a profile such that when the object to be vulcanized is placed between the mating molds the deformable mold will be deformed to have an inner surface profile under the roller conforming substantially to the exterior profile under the roller desired for the vulcanized object, said mating molds including portions at each end extending beyond the confined object and beyond the roller, and clamps, said clamp bearing solely on the ends of the molds beyond contact with the roller, one at one end and one at the other end to hold the mating molds together after they are removed from the pressure of the roller, said deformable mold also being formed initially so that when the ends of the mating molds are brought together the intermediate portion of the deformable mold will have a natural position due to its elasticity such that with the mating mold it defines a space less in volume than the volume of the completed vulcanized object so that during vulcanization it maintains a follow-up pressure on the object thereby preventing voids and sponginess in the completed vulcanized article.

3. A vulcanizing mold including two mating molds, one, at least, of said molds being formed of deformable elastic material and being initially formed to define a volume in conjunction with the mating mold less than the volume of the object to be vulcanized therebetween, an intermediate portion of said deformable mold being deformable when pressed against the object between the molds whereby a continuous elastic follow-up pressure is exerted upon the object being vulcanized.

References Cited in the file of this patent

UNITED STATES PATENTS

| | | |
|---|---|---|
| 1,502,377 | Davies | July 22, 1924 |
| 1,949,226 | Wallace | Feb. 27, 1934 |
| 1,984,768 | Shook | Dec. 18, 1934 |
| 2,054,476 | Derry et al. | Sept. 15, 1936 |
| 2,066,265 | Freeman | Dec. 29, 1936 |
| 2,187,253 | Wallace | Jan. 16, 1940 |
| 2,272,887 | Allen | Feb. 10, 1942 |
| 2,331,795 | McMahan | Oct. 12, 1943 |